US008260722B2

(12) United States Patent
Peart et al.

(10) Patent No.: US 8,260,722 B2
(45) Date of Patent: *Sep. 4, 2012

(54) SYSTEM AND METHOD FOR GENERATING AN UNPREDICTABLE NUMBER USING A SEEDED ALGORITHM

(75) Inventors: Lee J. Peart, Epsom (GB); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,678

(22) Filed: Jul. 14, 2011

(65) Prior Publication Data

US 2011/0270759 A1 Nov. 3, 2011

Related U.S. Application Data

(63) Continuation of application No. 11/306,617, filed on Jan. 4, 2006, now Pat. No. 8,001,054, which is a continuation-in-part of application No. 10/708,545, filed on Mar. 10, 2004, now Pat. No. 7,668,750, said application No. 11/306,617 is a continuation-in-part of application No. 10/340,352, filed on Jan. 10, 2003, now Pat. No. 7,889,052, which is a continuation-in-part of application No. 10/192,488, filed on Jul. 9, 2002, now Pat. No. 7,239,226.

(60) Provisional application No. 60/507,803, filed on Sep. 30, 2003, provisional application No. 60/396,577, filed on Jul. 16, 2002, provisional application No. 60/304,216, filed on Jul. 10, 2001.

(51) Int. Cl.
*G06Q 20/00* (2006.01)

(52) U.S. Cl. ............... 705/75; 705/64; 705/78; 705/24; 705/910; 705/39; 713/176; 726/3; 726/4; 726/5; 902/28; 902/2

(58) Field of Classification Search ..................... 705/75
See application file for complete search history.

(56) References Cited

U.S. PATENT DOCUMENTS

| | | | |
|---|---|---|---|
| 4,841,570 A | 6/1989 | Cooper | |
| 4,881,264 A | 11/1989 | Merkle | |
| 5,903,652 A | 5/1999 | Mital | |
| 5,999,625 A | 12/1999 | Bellare et al. | |
| 6,044,388 A | 3/2000 | DeBellis et al. | |
| 6,061,703 A | 5/2000 | DeBellis et al. | |
| 6,067,621 A | 5/2000 | Yu et al. | |

(Continued)

OTHER PUBLICATIONS

Non-Final Rejection mailed Aug. 4, 2008 in U.S. Appl. No. 11/306,617.

(Continued)

*Primary Examiner* — Jacob C. Coppola
(74) *Attorney, Agent, or Firm* — Snell & Wilmer L.L.P.

(57) ABSTRACT

A random number generating algorithm is seeded with an unpredictable number. The seed value is computed by subjecting variable data to a Secure Hashing Algorithm, and truncating the right most, or left most, 16 bytes from the message digest generated. The algorithm generates the unpredictable number by using the seed value as a counter value in the random number generator, and performing a data encryption standard operation. In one exemplary embodiment, the unpredictable number is modified to a predetermined maximum unpredictable number value as determined by the sender and receiver of the unpredictable number.

18 Claims, 5 Drawing Sheets

U.S. PATENT DOCUMENTS

| | | | |
|---|---|---|---|
| 6,078,888 | A | 6/2000 | Johnson, Jr. |
| 6,122,375 | A | 9/2000 | Takaragi et al. |
| 6,141,421 | A | 10/2000 | Takaragi et al. |
| 6,256,391 | B1 | 7/2001 | Ishiguro et al. |
| 6,307,938 | B1 | 10/2001 | Matyas, Jr. et al. |
| 6,920,560 | B2 | 7/2005 | Wallace, Jr. |
| 6,948,130 | B2 | 9/2005 | Long et al. |
| 7,085,532 | B2 | 8/2006 | Palin et al. |
| 7,237,121 | B2 | 6/2007 | Cammack et al. |
| 8,001,054 | B1 * | 8/2011 | Peart et al. ............ 705/75 |
| 2002/0002468 | A1 | 1/2002 | Spagna et al. |
| 2002/0044657 | A1 | 4/2002 | Asano et al. |
| 2002/0107798 | A1 | 8/2002 | Hameau et al. |
| 2002/0122543 | A1 | 9/2002 | Rowen |
| 2003/0056107 | A1 | 3/2003 | Cammack et al. |
| 2003/0083015 | A1 | 5/2003 | Palin et al. |
| 2003/0222909 | A1 | 12/2003 | Long et al. |
| 2004/0236819 | A1 | 11/2004 | Anati et al. |
| 2005/0033688 | A1 | 2/2005 | Peart et al. |
| 2005/0071231 | A1 | 3/2005 | Beenau et al. |
| 2005/0223230 | A1 | 10/2005 | Zick |
| 2008/0010218 | A1 | 1/2008 | Zank |

OTHER PUBLICATIONS

Final Rejection mailed Feb. 6, 2009 in U.S. Appl. No. 11/306,617.
Advisory Action mailed Apr. 16, 2009 in U.S. Appl. No. 11/306,617.
Non-Final Rejection mailed Jun. 11, 2009 in U.S. Appl. No. 11/306,617.
Final Rejection mailed Jan. 11, 2010 in U.S. Appl. No. 11/306,617.
Advisory Action mailed Mar. 19, 2010 in U.S. Appl. No. 11/306,617.
Notice of Allowance mailed Apr. 8, 2011 in U.S. Appl. No. 11/306,617.
"The Bank Credit Card Business", American Bankers Association, 1996, all pages.
Derfler, "How Networks Work", Bestseller Edition, 1996, Ziff-Davis Press, Emeryville, CA, all pages.
Menezes et al., "Handbook of Applied Cryptography", 1997, CRC Press LLC, Chapter 5.
White, "How Computers Work", Millennium Edition, 1999, Que Corporation, Indianapolis, IN, all pages.
Gralla, "How the Internet Works", Millennium Edition, 1999, Que Corporation, Indianapolis, IN, all pages.
Muller, "Desktop Encyclopedia of the Internet", 1999, Artech House Inc., Norwood, MA, all pages.
Rankl et al., "Smart Card Handbook", Second Edition, 2000, Wiley & Sons, all pages.
AU; Exam Report dated Jan. 28, 2010 in Application No. 2006348401.
AU; Exam Report dated Oct. 12, 2010 in Application No. 2006348401.
PCT; International Search Report dated May 22, 2008 in Application No. PCT/US2006/045362.
PCT; Written Opinion dated May 22, 2008 in Application No. PCT/US2006/045362.
PCT; International Preliminary Report on Patentability dated Feb. 27, 2009 in Application No. PCT/US2006/045362.

* cited by examiner

SYSTEM AND METHOD FOR GENERATING AN UNPREDICTABLE NUMBER USING A SEEDED ALGORITHM

CROSS-REFERENCE TO RELATED APPLICATIONS

This application is a continuation of, and claims priority to, U.S. patent application Ser. No. 11/306,617, entitled "SYSTEM AND METHOD FOR GENERATING AN UNPREDICTABLE NUMBER USING A SEEDED ALGORITHM," filed on Jan. 4, 2006. The '617 application is a continuation-in-part, and claims priority to, U.S. patent application Ser. No. 10/708,545, entitled "SYSTEM AND METHOD FOR SECURING RF TRANSACTIONS USING A RADIO FREQUENCY IDENTIFICATION DEVICE INCLUDING A TRANSACTIONS COUNTER," filed Mar. 10, 2004 (which itself claims priority to U.S. Provisional Application No. 60/507,803, filed Sep. 30, 2003). The '617 application is also a continuation-in-part of, and claims priority to, U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002). The '352 application is also a continuation-in-part, and claims priority to, U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed Jul. 9, 2002 (which itself claims priority to U.S. Provisional Patent Application No. 60/304,216, filed Jul. 10, 2001). All of the above-listed applications are incorporated herein by reference.

FIELD OF INVENTION

This invention generally relates to securing a transaction involving radio frequency identification (RFID) technology. More particularly, the invention relates to a system and method for securing the RFID enabled transaction using an unpredictable number generated by a seeded algorithm.

BACKGROUND OF THE INVENTION

Like barcode and voice data entry, RFID is a contactless information acquisition technology. RFID systems are wireless, and are usually extremely effective in hostile environments where conventional acquisition methods often fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical RFID fob is ordinarily a self-contained device, which may take the shape of any portable form factor. The RFID fob may include a transponder for transmitting information during a transaction. In some instances, a battery may be included in the fob to power the transponder, in which case the internal circuitry of the fob (including the transponder) may draw its operating power from the battery power source. Interrogation by the reader for activation of the fob is not required when using a battery source.

Alternatively, the fob may gain its operating power directly from a RF interrogation signal. U.S. Pat. No. 5,053,774, issued to Schuermann, describes a typical transponder RF interrogation system, which may be found in the prior art. The Schuermann patent generally describes the powering technology surrounding conventional transponder structures. U.S. Pat. No. 4,739,328 discusses a method by which a conventional transponder may respond to a RF interrogation signal. Other typical modulation techniques that may be used include, for example, ISO/IEC 14443 and the like. In the conventional fob powering technologies used, the fob is typically activated upon presenting the fob into an interrogation signal. In this regard, the fob may be activated irrespective of whether the user desires such activation.

One of the more visible uses of the RFID technology is the introduction of American Express' Expresspay®, Exxon/Mobil's Speedpass® and Shell's EasyPay® products. These products use transponders, placed in a fob or tag, which enable automatic identification of the user when the fob is presented at a merchant's point-of-sale (POS) device, for example, when attempting to complete a transaction. During the transaction completion, information from the RFID fob is ordinarily passed to the POS, which delivers the information to a merchant system.

To complete a typical transaction, fob identification data is passed to a third-party server database. The third-party server references the identification data to a consumer (e.g., user) credit or debit account. In an exemplary processing method, the third-party server seeks authorization for the transaction by passing the transaction and account data to an authorizing entity, such as for example an "acquirer" or account issuer. Once the server receives authorization from the authorizing entity, the authorizing entity sends clearance to the POS device for completion of the transaction.

To lessen the financial impact of fraudulent transactions in the RFID environment, fob issuers have focused much effort on securing RFID transactions. Many of the efforts have focused on securing the transaction account or related data during transmission from the user to the merchant, or from the merchant to a third-party server or account provider system. For example, one conventional method for securing RFID transactions involves requiring the device user to provide a secondary form of identification during transaction completion. The RFID transaction device user may be asked to enter a personal identification number (PIN) into a keypad. The PIN may then be verified against a number associated with the user or the RFID transaction device, wherein the associated number is stored in an account issuer database. If the PIN number provided by the device user matches the associated number, then the transaction may be cleared for completion.

One problem with the issuer's efforts in securing RFID transactions is that they are susceptible to eavesdropping and decrypting during transit, such as when transferred from the merchant system to the account issuer system. Such information may be sensitive information concerning the fob user or the fob user's account. Should the fob user's sensitive information be retrieved without authorization during transit, the fob user or issuer may be subjected to fraudulent activity.

As such, a need exists for a method of securing sensitive transaction account information, which permits the account provider, merchant system, or acquirer to have a significant influence on the security of the fob user information stored on a merchant system.

SUMMARY OF THE INVENTION

The invention includes a system and method for generating an unpredictable number using a seeded algorithm. The algorithm is seeded using a random 16-byte value used as a counter. The random 16-byte value is used in a pseudo random number generator to produce the unpredictable number.

In one embodiment, the random 16-byte value is generated from variable data. The variable data is subjected to a Secure Hashing Algorithm to produce a message digest. The left most, or right most 16 bytes of the message digest is selected as the random 16-byte value. In another embodiment, the random 16-byte value is used in a pseudo random number generator to produce the unpredictable number. A range of values for the unpredictable number is chosen, and the maximum value permitted for the unpredictable number is determined. A standard triple Data Encryption Standard (DES) operation is then performed on the random 16-byte value to produce the unpredictable number. In one exemplary embodiment, the unpredictable number is subjected to a mod function to trim the unpredictable value to the maximum value permitted.

BRIEF DESCRIPTION OF THE DRAWINGS

A more complete understanding of the present invention may be derived by referring to the detailed description and claims when considered in connection with the Figures. In the Figures, like numerals refer to similar elements, throughout.

DETAILED DESCRIPTION

The present invention is described herein in terms of various functional components and processing steps. It should be appreciated that such functional components and processing steps may be realized by any number of software, hardware or structural components configured to perform the specified functions. For example, the present invention may be practiced using various integrated circuit components (e.g., memory elements, digital signal processing elements, logic elements, look-up tables, and the like), which may perform a variety of functions under the control of one or more microprocessors.

Figure 1:
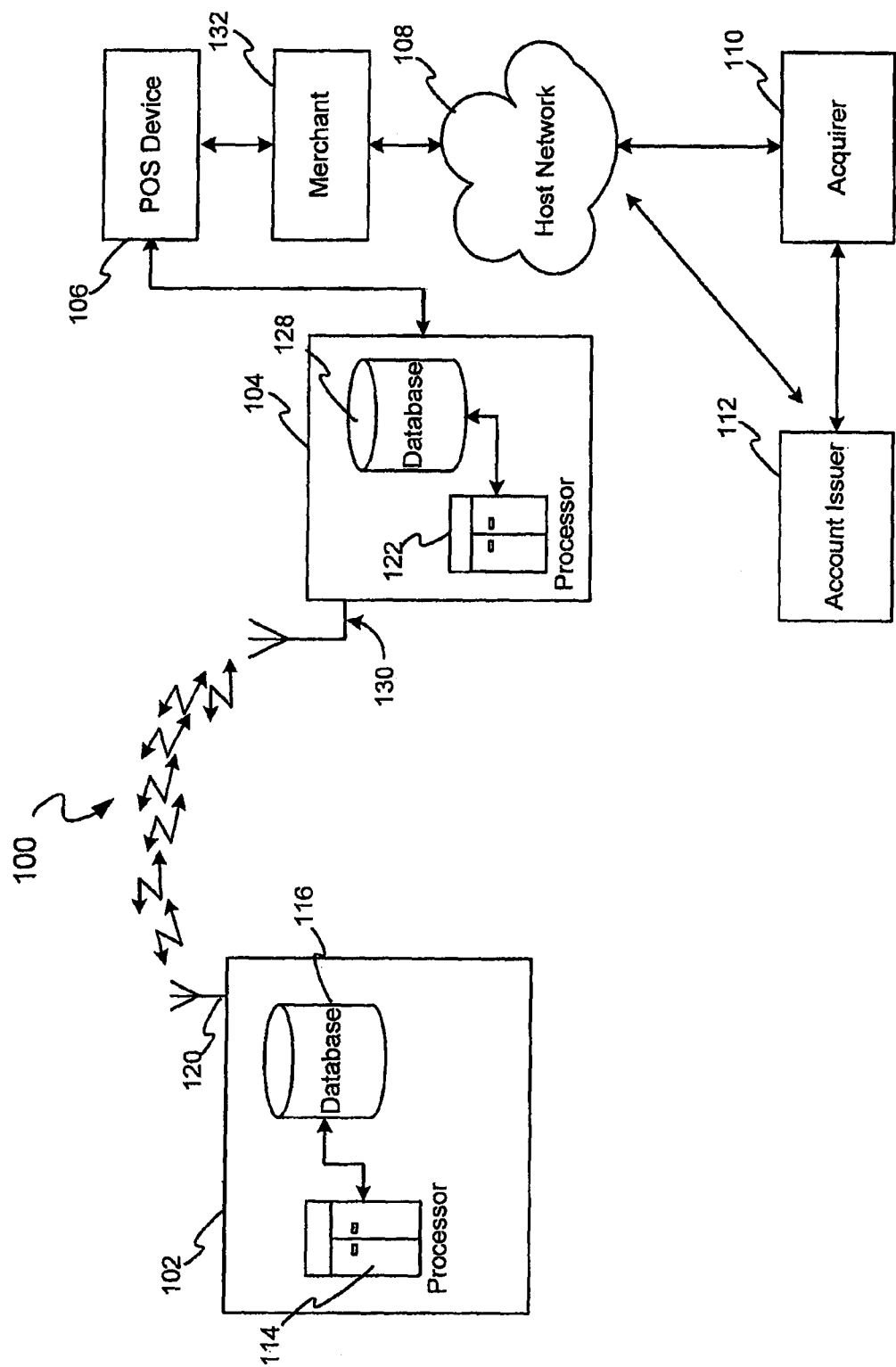
FIG. 1 illustrates an exemplary RFID-based system depicting exemplary components for use in RFID transaction completion in accordance with an embodiment of the present invention.

FIG. 1 illustrates an exemplary secure RFID transaction system 100 in accordance with the present invention. In general, system 100 includes an RFID transaction device 102 in RF communication with an RFID reader 104 for transmitting data there between. RFID reader 104 is in further communication with a merchant point-of-sale (POS) device 106 for providing to POS 106 data received from RFID transaction device 102. POS 106 is in further communication with a merchant system 132 for receiving data from the RFID transaction device and providing incentives. Merchant system 132 is in further communication with an acquirer 110 or an account issuer 112 via host network 108. Merchant system 132 transmits a transaction request to acquirer 110 or account issuer 112. The transaction request includes information received from RFID reader 104, RFID transaction device 102 and any information from merchant system 132 concerning the transaction. In sending the transaction request, merchant system 132 requests authorization that the transaction is to be approved or denied. In response, acquirer 110 or account issuer 112 provides merchant system 132 with the authorization necessary for transaction completion.

Although the point-of-interaction (POI) device is described with respect to a merchant point-of-sale (POS) device, the invention is not to be so limited. Indeed, a merchant POS device is used by way of example. Thus, the point-of-interaction device includes any device capable of receiving transaction device 102 account data or data from RFID reader 104. In this regard, the POS includes any point-of-interaction device enabling the user to.complete a transaction using transaction device 102. POS device 106 receives RFID transaction device 102 information and provides the information to merchant system 132 for processing.

As used herein, an "acquirer" is any software, hardware, and/or entity including various databases and processors for facilitating the routing of the transaction request to an appropriate account issuer 112. Acquirer 110 routes the request to account issuer 112 in accordance with a routing number provided by RFID transaction device 102. The "routing number" in this context is a unique network address or any similar device for locating an account issuer 112 on host network 108. Traditional means of routing the payment request in accordance with the routing number are well understood. As such, the process for using a routing number to provide the payment request will not be discussed herein for brevity.

Additionally, account issuer ("account provider" or "issuer system") 112 includes any software, hardware, and/or entity which provides a transaction account for facilitating completion of a transaction request. The transaction account includes any charge, credit, debit, loyalty, direct debit, checking, savings, financial or other account. The term "issuer" or "account provider" also refers to any software, hardware, and/or entity facilitating payment of a transaction using a transaction device, and which includes systems permitting payment using at least one of a preloaded and non-preloaded transaction device. Typical issuers include American Express, MasterCard, Visa, Discover, and the like. In the preloaded value processing context, an exchange value (e.g., money, rewards points, barter points, etc.) is stored in a preloaded value database (not shown) for use in completing a requested transaction. The preloaded value database, and thus the exchange value, may not be stored on transaction device itself, but is stored remotely, such as, for example, at account issuer 112 location. Further, the preloaded value database is debited the amount of the transaction requiring the value to be replenished. The preloaded value includes any conventional value (e.g., monetary, currency units, rewards points, barter points, etc.) which is exchanged for goods or services. In that regard, the preloaded value has any configuration as determined by issuer system 112.

In general, during operation of secure system 100, RFID reader 104 provides an interrogation signal via antenna 130 to transaction device 102 for powering transaction device 102 and receiving transaction device 102 related data. The interrogation signal is received at a transaction device antenna 120 and is further provided to a transponder (not shown). In response, a transaction device processor 114 retrieves a transaction device identifier from a transaction device database 116 for providing to RFID reader 104. RFID reader 104 receives the transaction device identifier at antenna 130. RFID reader processor 122 is provided the transaction device identifier and processes it.

As noted, transaction account issuers are continually seeking new ways to secure an RFID transaction. In accordance with the present invention, an RFID transaction is secured using an unpredictable number (UN). In one embodiment, the UN is generated by RFID reader 104 and used by transaction device 102 as one of the data elements that is an input to the calculation of a cryptogram calculated by transaction device 102 and sent in the authorization message. For more information on calculating cryptograms, see U.S. patent application Ser. No. 10/708,545, entitled "SYSTEM AND METHOD FOR SECURING RF TRANSACTIONS USING A RADIO FREQUENCY IDENTIFICATION DEVICE INCLUDING A TRANSACTIONS COUNTER," filed Mar. 10, 2004, and U.S. patent application Ser. No. 10/905,005, entitled "SYSTEM AND METHOD FOR AUTHENTICATING A RF TRANSACTION USING A RADIO FREQUENCY IDENTIFICATION DEVICE INCLUDING A TRANSACTIONS COUNTER," filed Dec. 9, 2004, both of which are incorporated herein by reference.

Use of a UN in the calculation of the cryptogram prevents or restricts an unauthorized person from stealing a copy of a transaction and sending this transaction to issuer 112 because the reader generates a random value for the UN and it is nearly impossible to predict the value of the UN to be used for each transaction. The unpredictable number, in one embodiment, is generated using a seeded algorithm. The algorithm is a pseudo random number generator. In another embodiment, the time clock on the reader or POS terminal, which is in seconds, milliseconds, and/or any other time frame, is used. In yet another embodiment, the algorithm is seeded with the transaction value in cents concatenated with the time in milliseconds (or any other time increment) and/or any other changing numerical value that can be used to seed the algorithm.

Figure 4:
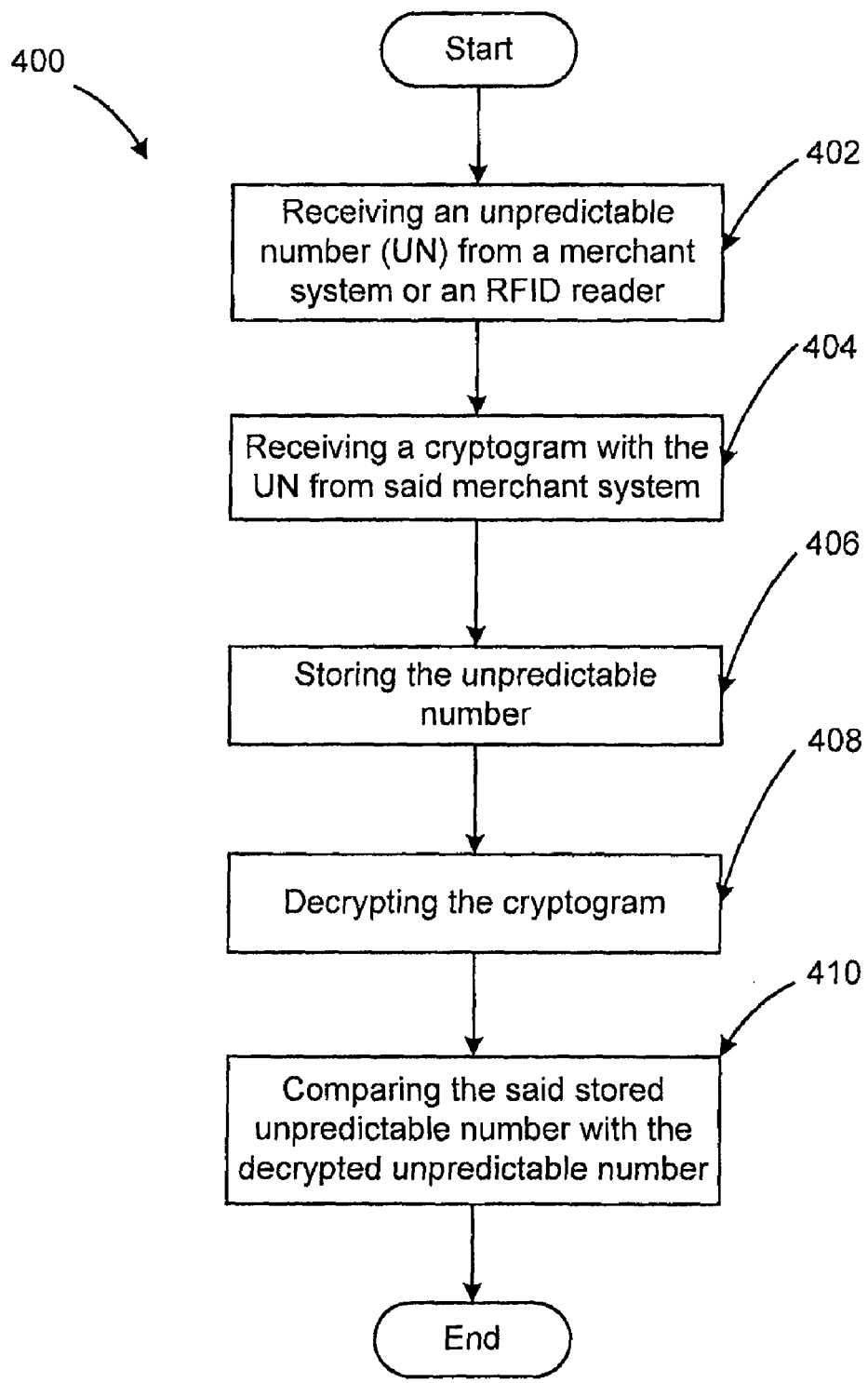
FIG. 4 is a block diagram of an exemplary method for using an unpredictable number in a cryptogram in accordance with an embodiment of the present invention.
Figure 5:
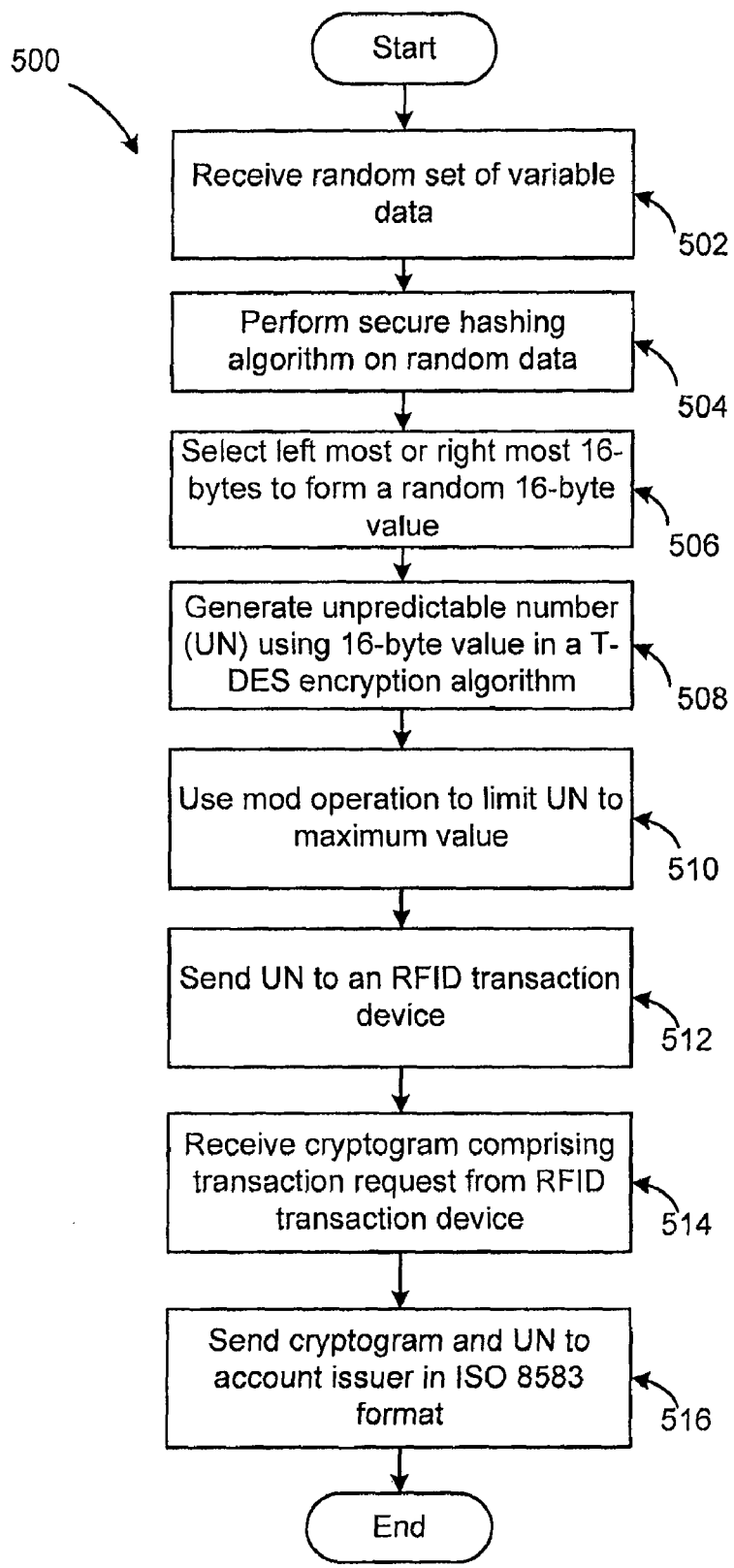
FIG. 5 is a block diagram of an exemplary method for using an unpredictable number in a cryptogram to encrypt a transaction request in accordance with an embodiment of the present invention.

An exemplary use of the UN in the cryptogram is accomplished as follows: RFID reader 104 sends a UN to transaction device 102 at, for example, the start of a payment transaction. Transaction device 102 encrypts the UN together with other information (a transaction counter and a user identifier) using a secret key and sends the transaction to RFID reader 104. The process continues as illustrated in FIG. 4, RFID reader 104 sends the encrypted data (called a cryptogram) and a copy of the UN to account issuer 112 (e.g., in a magnetic stripe format using the ISO 8583 financial message), (Steps 402 and 404), wherein account issuer 112 stores the UN (Step 406), checks that the cryptogram is valid, decrypts the cryptogram (Step 408) and checks that the cryptogram contains an encrypted form of the UN sent by RFID reader 104 (Step 410). If the values are all valid, the transaction is known to have been generated by a transaction device issued by issuer 112 and that it has not been tampered with. Note that the secret key is loaded onto transaction device 102 by issuer 112 when transaction device 102 is created using standard industry secure methods for key management.

Figure 2:
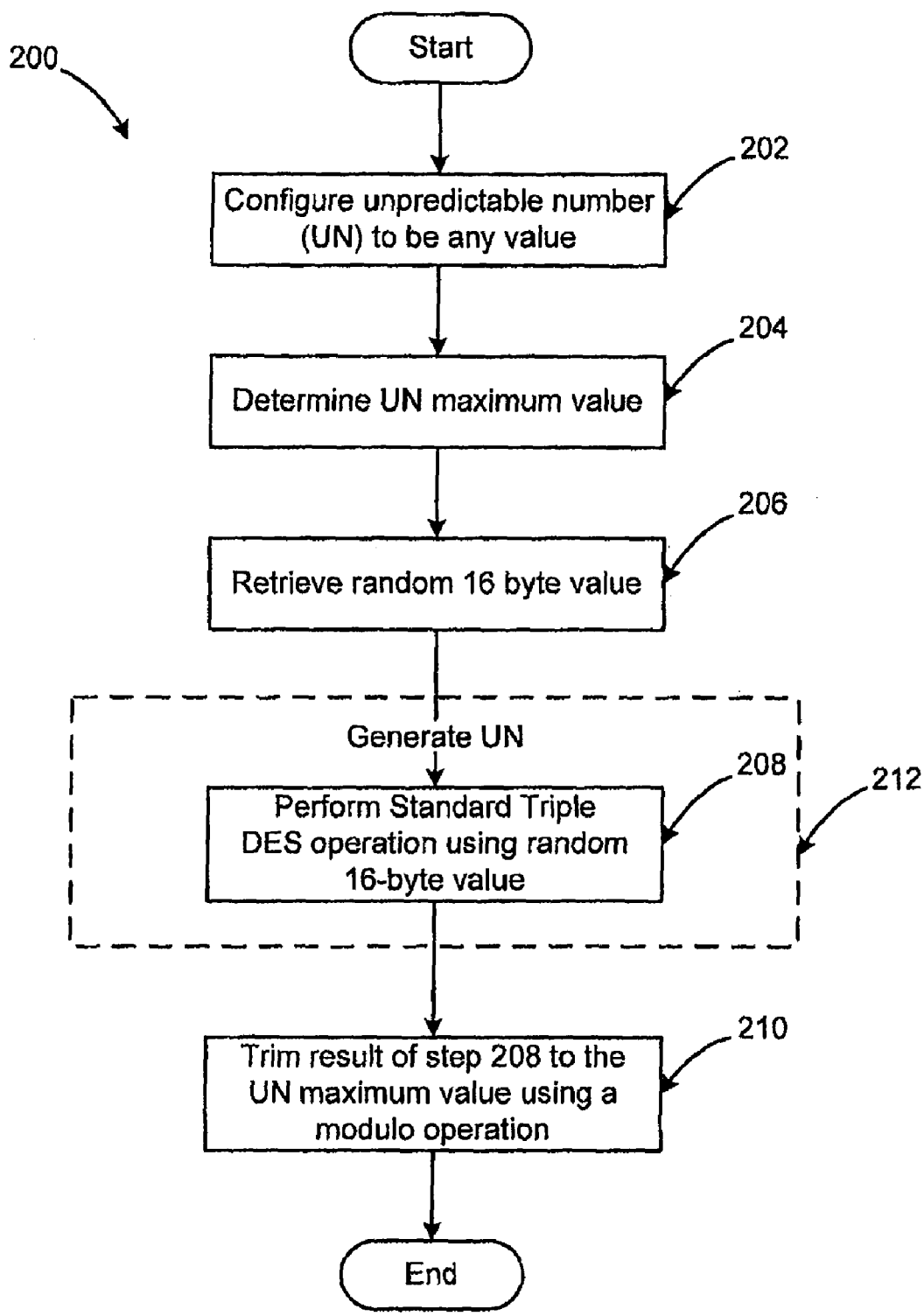
FIG. 2 is a block diagram of an exemplary method for a seeded algorithm in accordance with an embodiment of the present invention.

FIG. 2 depicts an exemplary method 200 of a suitable algorithm in accordance with the present invention. The algorithm is processed using RFID processor 122. Method 200 includes seeding a pseudo random number generator with the unpredictable number generated in accordance with the invention.

Two parties communicating using the present invention may decide that the resulting unpredictable number may have any value (Step 202). For example, the sending party (e.g., merchant system 132) and the receiving party (e.g., account issuer 112) may determine that the unpredictable number may have a value range of 0 to 64000. The strength of the security is improved with a larger value for the UN. For example if the range is 0-7, then there is a 1 in 8 chance that someone could 'guess' the correct value of the UN and compromise the security of the transaction. For example, if the range is 1-64000, then the chances for 'guessing' the value is much reduced because it is a 1 in 64000 chance that the guess is correct.

The algorithm of method 200 then uses the predetermined value of the unpredictable number to determine the maximum value of the resulting unpredictable number (Step 204). For example, the maximum value of the UN is selected based on the available space in the message sent to issuer 112. This limitation is based on, for example, the space in track 1 or 2 of the magnetic stripe format used for financial transactions. The limitation may also be based on the use of predefined optional fields in the ISO 8583 message sent to the issuer and in this case, larger values are used. The final selection of the maximum value is a compromise between the available space in the magnetic stripe format (or the ISO8583 format) which limits the size, and the desired maximum value to make it difficult to predict the UN. The largest size that can be used on the network is normally selected to maximize the strength of the security. The algorithm is then seeded with a seed value generated in accordance with the method of FIG. 3.

Figure 3:
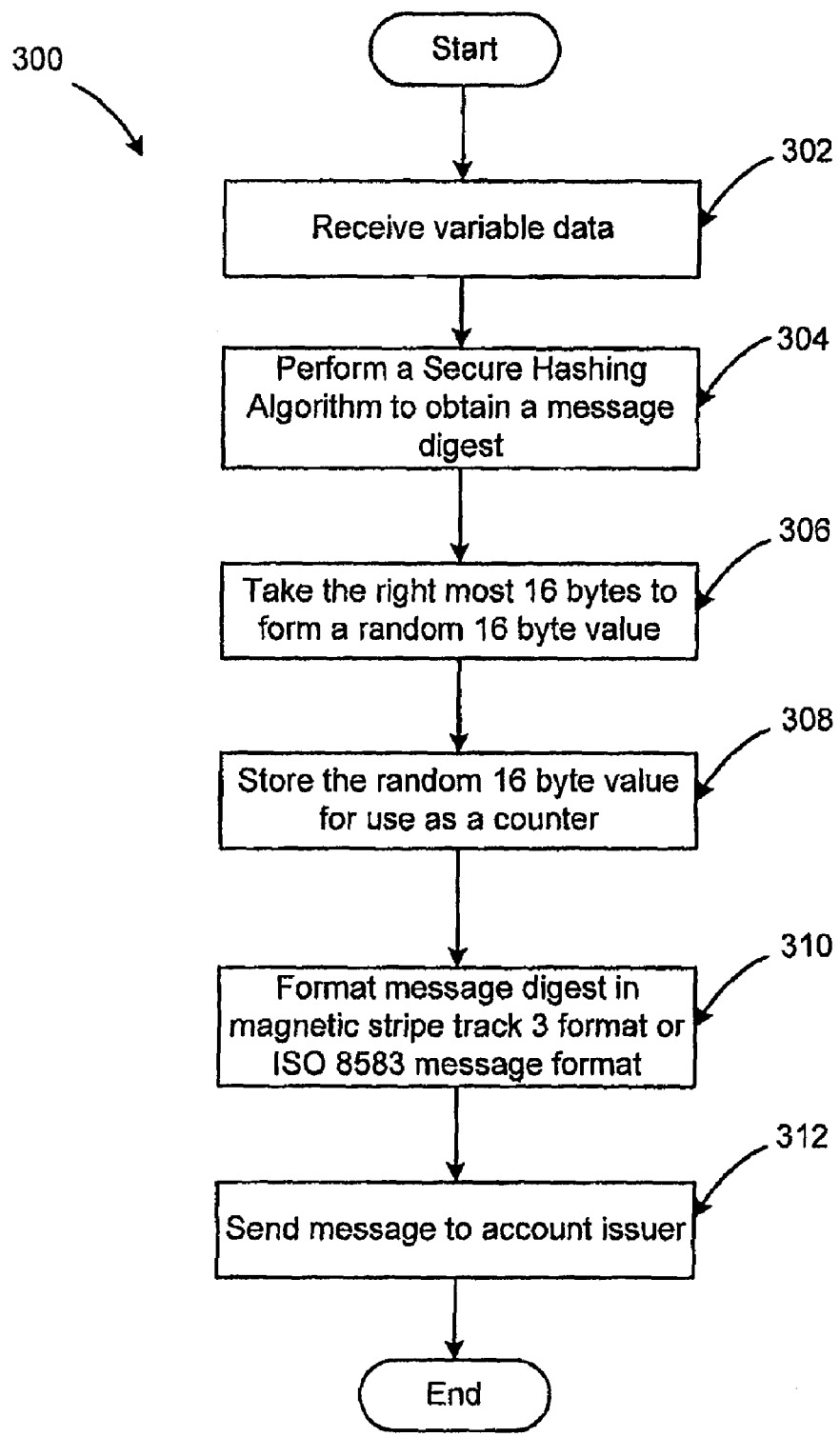
FIG. 3 is a block diagram of an exemplary method for generating a random counter value in accordance with an embodiment of the present invention.

With brief reference to FIG. 3, an exemplary method 300 of generating the seed value according to this invention is described. In one exemplary embodiment, RFID processor 122 receives variable data from RFID transaction device 102 for use in generating the seed value and running the algorithm illustrated by method 200 (Step 302). The variable data includes any data related to RFID transaction device 102, RFID reader 104 or the transaction requested. For example, the variable data is an RFID reader 104 identifier, a counter value provided by RFID reader 104 or RFID transaction device 102, the time of the transaction, a secret password or phrase related to RFID transaction device 102, an RFID transaction device identifier, non-RFID readers and/or transaction device identifiers and/or data, PIN data, loyalty data, inventory data, storage data, financial data, user data, and the number of milliseconds since the RFID reader 104 has processed the most recent transaction.

RFID processor 122 then performs a secure hashing algorithm on the variable data to obtain an output called a "message digest" (Step 304). RFID processor 122 performs suitable secure hashing algorithms that include, for example, any secure hashing algorithm defined by the Federal Information Processing Standard Publication 180-1, incorporated herein by reference. For example, Secure Hashing Algorithm SHA-1 is an exemplary algorithm that is useful with this invention.

In one exemplary embodiment, the message digest generated by RFID processor 122 includes 160-bits (20-bytes). RFID processor 122 truncates the message digest into a 16-byte format. In one exemplary embodiment, RFID processor 122 truncates the message digest so that only the right most (or left most) 16 bytes of the message digest remain (Step 306). Processor 122 then provides the 16-byte value to a RFID database 128 for storage and/or later use as a counter value in the algorithm describe in FIG. 2 (Step 308). In one embodiment, RFID formats the message digest into either magnetic stripe track 1 format or ISO 8583 format (Step 310) and sends the message to the account issuer.

Returning now to FIG. 2, RFID processor 122 retrieves the 16-byte value (e.g., counter value) from database 128 (Step 206). RFID processor 122 then uses the counter value to seed the algorithm for use in generating the unpredictable number (Step 212). For example, RFID processor 122 retrieves the counter value and uses the value in a pseudo number generator to generate the unpredictable number using a Data Encryption Standard (Step 208). Exemplary Data Encryption Standards (DES) which are used are those described in Federal Information Processing Standards (FIPS) Publication 46-3, incorporated herein by reference. In this way, RFID processor 122 creates a random number using the unpredictable number generated by the pseudo number generator. A range of values for the unpredictable number can be chosen, and the maximum value permitted for the unpredictable number is determined.

In an exemplary embodiment, the sender or receiver may wish to trim the unpredictable number to the maximum value allowed (Step 210). Trimming of the maximum number is used because of limitations in the available space in a message. The message can be a magnetic stripe formatted message (track 1, 2 or 3) or a suitable field in the ISO8583 message used to send financial transactions to issuer 112. For example, in one embodiment, RFID processor 122 uses a modification function to trim the unpredictable number as predetermined by merchant system 132 and/or account issuer 112.

Although an embodiment of the invention includes generating an unpredictable number at RFID reader 104, the invention is not so limited. The unpredictable number is generated and/or regenerated by any one of the computing systems in the transaction stream. For example, the unpredictable number is generated by computing systems at the account issuer 112, acquirer 110, the receiver, or merchant system 132 locations. Moreover, the algorithm described herein is used in any environment wherein security of a transaction is required.

The system may include an application server, host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers.

Similarly, the software elements of the present invention can be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention employs any number of conventional techniques for communicating data, data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

The term "communication" refers to a signal that travels to/from one component to another. The components are directly connected to each other or are connected through one or more other devices or components. The various coupling components for the devices can include but are not limited to the Internet, a wireless network, a conventional wire cable, an optical cable or connection through air, water, or any other medium that conducts signals, and any other coupling device or medium. A variety of conventional communications media and protocols are used for data links between components. For example, the data links include an Internet Service Provider (ISP) configured to facilitate communications over a local loop as is typically used in connection with standard modem communication, cable modem, dish networks, ISDN, Digital Subscriber Lines (DSL), or any wireless communication media. In addition, a merchant system according to this invention includes a POS device and host network. The merchant system may reside on a local area network which interfaces to a remote network for remote authorization of an intended transaction. The merchant system communicates with the remote network via a leased line, such as a T1, D3 line, or the like. Such communications lines are described in a variety of texts, such as, "Understanding Data Communications," by Gilbert Held, which is incorporated herein by reference.

Certain communications between the parties and the system of the present invention are accomplished through any suitable communication means, such as, for example, a telephone network, intranet, Internet, point-of-interaction device (point-of-sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

Where required, the system user communicates with a system via any input device such as, a keypad, keyboard, mouse, kiosk, personal digital assistant, handheld computer (e.g., Palm Pilot®, Blackberry®), cellular phone and/or the like). Similarly, the invention could be used in conjunction with any type of personal computer, network computer, work station, minicomputer, mainframe, or the like, running any operating system such as any version of Windows, Windows NT, Windows 2000, Windows 98, Windows 95, MacOS, OS/2, BeOS, Linux, UNIX, Solaris, or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

It should be further noted that the transfer of information in accordance with this invention, is done in a format recognizable by a merchant system or account issuer. In that regard, by way of example, the information is transmitted in magnetic stripe or multi-track magnetic stripe format. Because of the proliferation of devices using magnetic stripe format, the standards for coding information in magnetic stripe format were standardized by the International Standards Organization (ISO).

Typically, magnetic stripe information is formatted in three tracks. Certain industry information must be maintained on certain portion of the tracks, while other portions of the tracks may have open data fields. The contents of each track and the formatting of the information provided to each track is controlled by ISO standard ISO/IEC 7811. For example, the information must typically be encoded in binary. Track 1 is usually encoded with user information (name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, currency units, amount authorized per cycle, subsidiary accounts, and restrictions.

As such, where information is provided in accordance with this invention, it is provided in magnetic stripe format track. For example, counter values, authentication tags and encrypted identifiers, described herein, is forwarded encoded in all or a portion of a data stream representing data encoded in, for example, track 2 or track 3 format.

An RFID transaction device identifier, as used herein, may include an identifier for a transaction device which is correlated to a user transaction account (e.g., credit, charge debit, checking, savings, reward, loyalty, or the like) maintained by a transaction account provider (e.g., payment authorization center). A typical transaction account identifier (e.g., account number) is correlated to a charge, credit or debit account, loyalty account, or rewards account maintained and serviced by such entities as American Express, Visa and/or MasterCard, or the like.

In that regard, the transaction device identifier discussed herein may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer. The account number is stored as Track 1 and Track 2 data as defined in ISO/IEC 7813, and is unique to RFID transaction device.

In one exemplary embodiment, the transaction device identifier may include a unique RFID transaction device serial number and user identification number, as well as specific application applets. In another embodiment, the transaction device identifier may include a marker that facilitates recognition of the transaction device identifier as originating with an RFID device. The transaction device identifier is stored on a transaction device database located on the transaction device. Additionally, the RFID device may include a transaction device database configured to store multiple account numbers issued to an RFID transaction device user by the same or different account providing institutions. In addition, where the transaction device identifier corresponds to a loyalty or rewards account, a merchant system database is configured to store the attendant loyalty or rewards points data in associated relationship with the RFID transaction device identifier.

In addition to the above, the transaction device identifier is associated with any secondary form of identification configured to allow the consumer to interact or communicate with a payment system. For example, the transaction device identifier is associated with, an authorization/access code, personal identification number (PIN), Internet code, digital certificate, biometric data, and/or other secondary identification data used to verify a transaction device user identity.

Databases discussed herein is a graphical, hierarchical, relational, object-oriented or other database, and is maintained on a local drive of a server or on a separate computer coupled to the server via a local area or other network (not shown). In one embodiment, databases disclosed are a collection of ASCII or other text files stored on a local drive of a server. Database information is suitably retrieved from the database and provided to transaction processing systems upon request via a server application, as described more fully below.

Further still, various components are described herein in terms of their "validity." In this context, a "valid" component is one which is authorized for use in completing a transaction request in accordance with the present invention. Contrarily, an "invalid" component is one which is not authorized for transaction completion. In addition, an invalid component is one which is not recognized as being permitted for use on the secure RF system described herein.

It should be noted that conventional components of RFID transaction devices may not be discussed herein for brevity. For instance, one skilled in the art will appreciate that RFID transaction device and RFID reader disclosed herein include traditional transponders, antennas, protocol sequence controllers, modulators/demodulators and the like, necessary for proper RFID data transmission. As such, those components are contemplated to be included in the scope of the invention. For a more detailed description of the operation of RFID transaction devices and RFID readers please refer to commonly-owned U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, and its progeny, all incorporated by reference in their entirety.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. In addition, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The invention claimed is:
1. A method comprising:
    determining, by a computer based system for generating a truncated unpredictable number to facilitate securing a transaction and based upon at least one of an account issuer or a merchant system, a proposed maximum value for an unpredictable number;
    performing, by the computer based system, a secure hashing algorithm on variable data to produce a message digest, wherein the secure hashing algorithm is configured to produce a digest of at least 16 bytes;

selecting, by the computer based system, at least one of a left-most 16 bytes or a right-most 16 bytes of the message digest to form a random 16-byte value;

creating, by the computer based system, the unpredictable number using the random 16-byte value as an input for a seeded pseudo-random number generator;

truncating, by the computer based system, the unpredictable number to create the truncated unpredictable number, wherein the truncated unpredictable number is limited to the proposed maximum value; and sending, by the computer based system, the truncated unpredictable number and a cryptogram to an account issuer, wherein the account issuer validates the cryptogram and verifies that the cryptogram includes the truncated unpredictable number.

2. The method of claim 1, wherein the computer based system is a Radio Frequency Identification (RFID) reader.

3. The method of claim 1, further comprising obtaining variable data.

4. The method of claim 3, wherein the obtaining the variable data includes receiving at least one of an RFID transaction device identifier, RFID transaction device data, an RFID reader identifier, RFID reader data, transaction request data, a counter value provided by the computer based system, a counter value provided by the RFID transaction device, a time of the transaction, a password related to the RFID transaction device, non-RFID transaction device data, non-RFID reader data, PIN data, loyalty data, inventory data, storage data, financial data, user data, or a number of milliseconds since the RFID reader has processed a most recent transaction.

5. The method of claim 1, wherein the seeded pseudo-random number generator comprises a triple Data Encryption Standard (DES) operation.

6. The method of claim 1, wherein the performing the secure hashing algorithm on the variable data to produce the message digest comprises formatting the message in at least one of magnetic strip format, track 1 format, track 2 format, or track 3 format.

7. The method of claim 1, further comprising:
sending, by the computer based system, the truncated unpredictable number to an RFID transaction device; and
receiving, by the computer based system, the cryptogram from the RFID transaction device, wherein the cryptogram includes the truncated unpredictable number.

8. The method of claim 1, wherein the sending the cryptogram and the truncated unpredictable number to the account issuer comprises sending in a magnetic stripe format using an ISO 8583 message.

9. The method of claim 1, wherein the performing the secure hashing algorithm on the variable data comprises using a Radio Frequency Identification (RFID) processor to perform the secure hashing algorithm.

10. The method of claim 1, wherein the performing the secure hashing algorithm on a random set of variable data comprises using Secure Hashing Algorithm SHA-1.

11. An article of manufacture including a non-transitory, tangible computer readable storage medium having instructions stored thereon that, in response to execution by a computer-based system for generating a truncated unpredictable number to facilitate securing a transaction, cause the computer-based system to perform operations comprising:
determining, by the computer based system and based upon at least one of an account issuer or a merchant system, a proposed maximum value for an unpredictable number;

performing by the computer based system, a secure hashing algorithm on variable data to produce a message digest, wherein the secure hashing algorithm is configured to produce a digest of at least 16 bytes;

selecting, by the computer based system, at least one of a left-most 16 bytes or a right-most 16 bytes of the message digest to form a random 16-byte value;

creating by the computer based system, the unpredictable number using the random 16-byte value as an input for a seeded pseudo-random number generator;

truncating, by the computer based system, the unpredictable number to create the truncated unpredictable number, wherein the truncated unpredictable number is limited to the proposed maximum value; and sending, by the computer based system, the truncated unpredictable number and a cryptogram to an account issuer, wherein the account issuer validates the cryptogram and verifies that the cryptogram includes the truncated unpredictable number.

12. A system comprising:
a processor for generating a truncated unpredictable number to facilitate securing a transaction,
a tangible, non-transitory memory configured to communicate with the processor,
the tangible, non-transitory memory having instructions stored thereon that, in response to execution by the processor, cause the processor to perform operations comprising:
determining, by the processor and based upon at least one of an account issuer or a merchant system, a proposed maximum value for an unpredictable number;
performing by the processor, a secure hashing algorithm on variable data to produce a message digest, wherein the secure hashing algorithm is configured to produce a digest of at least 16 bytes;
selecting by the processor, at least one of a left-most 16 bytes or a right-most 16 bytes of the message digest to form a random 16-byte value;
creating, by the processor, the unpredictable number using the random 16-byte value as an input for a seeded pseudo-random number generator;
truncating, by the processor, the unpredictable number to create the truncated unpredictable number, wherein the truncated unpredictable number is limited to the proposed maximum value; and
sending, by the processor, the truncated unpredictable number and a cryptogram to an account issuer, wherein the account issuer validates the cryptogram and verifies that the cryptogram includes the truncated unpredictable number.

13. The system of claim 12, wherein the processor is an Radio Frequency Identification (RFID) reader.

14. The system of claim 12, further comprising obtaining variable data.

15. The system of claim 14, wherein the obtaining the variable data includes receiving at least one of an RFID transaction device identifier, RFID transaction device data, an RFID reader identifier, RFID reader data, transaction request data, a counter value provided by the computer based system, a counter value provided by the RFID transaction device, a time of the transaction, a password related to the RFID transaction device, non-RFID transaction device data, non-RFID reader data, PIN data, loyalty data, inventory data, storage data, financial data, user data, or a number of milliseconds since the RFID reader has processed a most recent transaction.

16. The system of claim 12, wherein the seeded pseudo-random number generator comprises a triple Data Encryption Standard (DES) operation.

17. The system of claim 12, wherein the performing the secure hashing algorithm on the variable data to produce the message digest comprises formatting the message in at least one of magnetic strip format, track 1 format, track 2 format, or track 3 format.

18. The system of claim 12, further comprising:
sending, by the computer based system, the truncated unpredictable number to an RFID transaction device; and
receiving, by the computer based system, the cryptogram from the RFID transaction device, wherein the cryptogram includes the truncated unpredictable number.

* * * * *